May 1, 1945. H. E. KAYE 2,374,820

THRUST BEARING

Filed Sept. 29, 1943 2 Sheets-Sheet 1

INVENTOR
HUBERT E. KAYE
BY
Bodell and Thompson
Attorneys

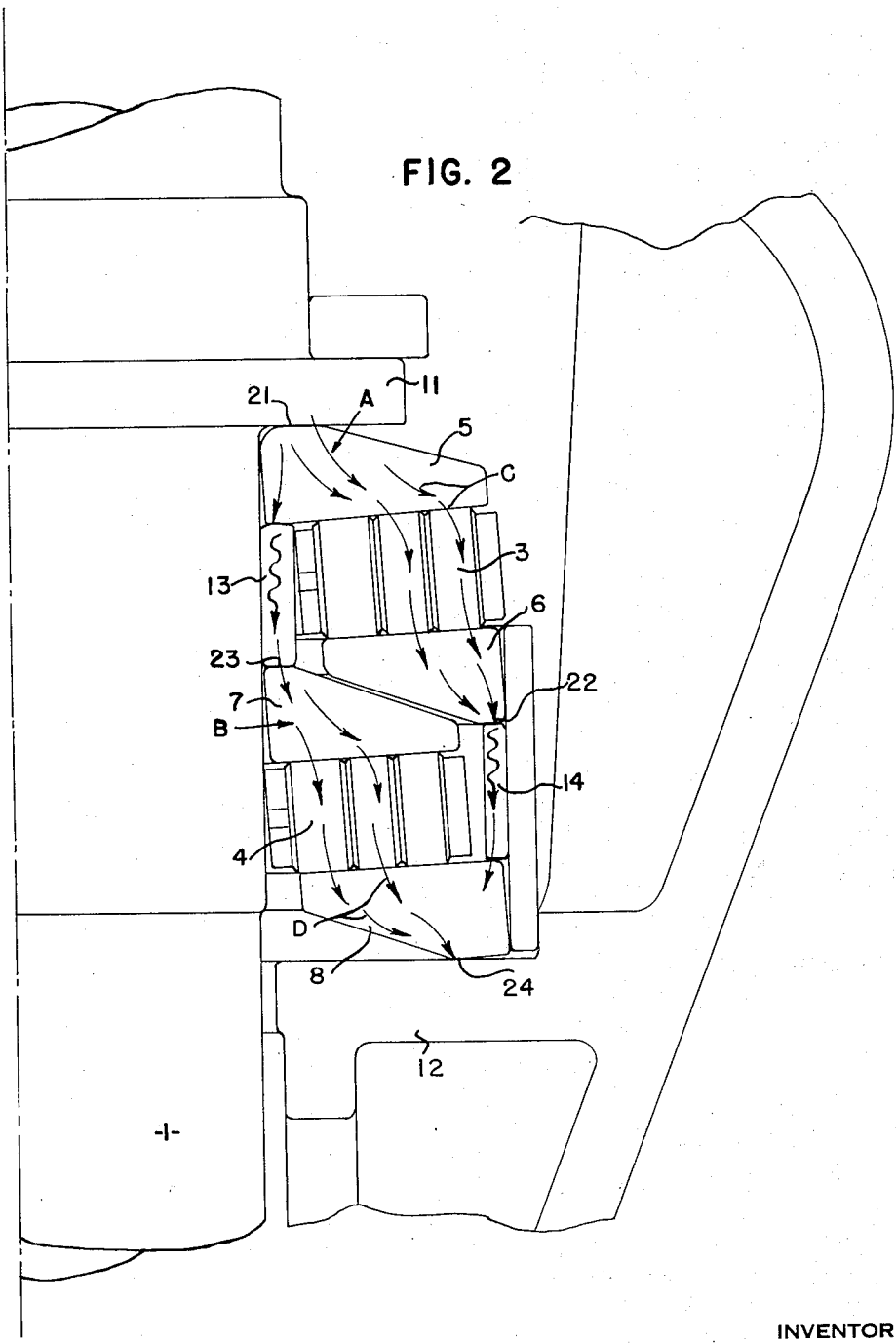

Patented May 1, 1945

2,374,820

UNITED STATES PATENT OFFICE 2,374,820

THRUST BEARING

Hubert E. Kaye, East Syracuse, N. Y., assignor to Rollway Bearing Co., Inc., Syracuse, N. Y., a corporation of New York Application September 29, 1943, Serial No. 504,211

4 Claims. (Cl. 308—231)

This invention relates to antifriction thrust bearings which embody a plurality of series of rollers or antifriction members spaced apart in an axial direction, and has for its object a construction by which the load is divided substantially in two paths, in one path through thrust members partly by-passing the load around one series of rollers, and the other through said one series of rollers and partly by-passing the other series of rollers, the bearing rings being so mounted as to thrust on the compression thrust members and also have a fulcruming, cantilever or warping action, bringing their bearing faces, which are normally in planes at a right angle to the axis of the thrust bearing, into an inclined plane or in a conical formation but maintaining said bearing faces in parallelism.

The invention consists in the novel features and in the combinations and constructions hereinafter set forth and claimed.

In describing this invention, reference is had to the accompanying drawings, in which like characters designate corresponding parts in all the views.

Figure 2 is a diagrammatic view illustrating the cantilever or warping action under load of the bearing rings.

Figure 1:
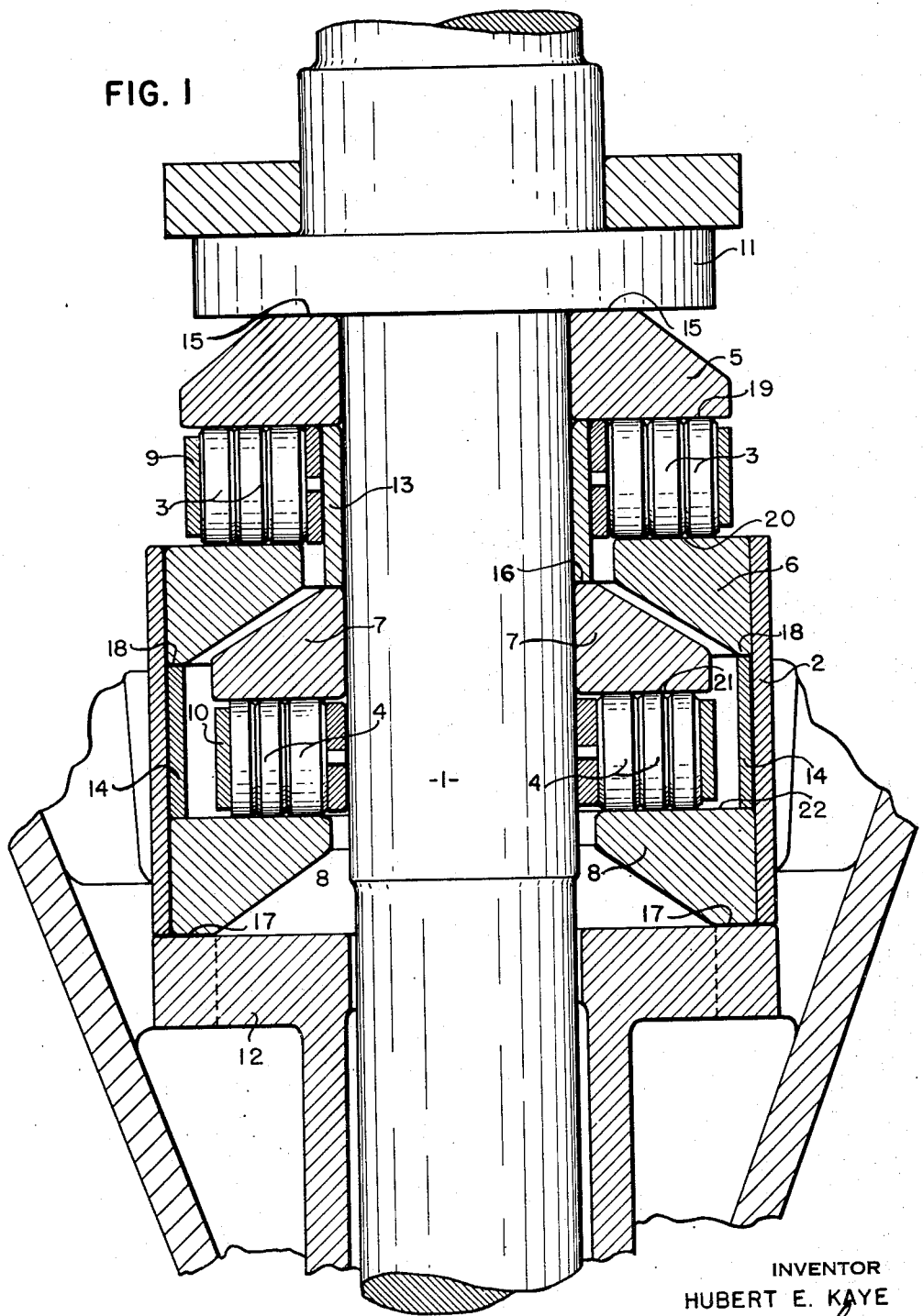
Figure 1 is a vertical sectional view of a bearing embodying this invention.

1 designates a rotatably mounted shaft, as the shaft of a well drilling apparatus, which supports the drill through cables with drill rods suspended therefrom. 2 designates a housing supported in any well known manner, and in which the shaft 1 is mounted. One of these parts, usually the shaft, is rotatable, and the other, stationary. 3 and 4 designate two annular series of antifriction members or rollers spaced axially, the rollers 3 being located between outer and inner bearing rings 5, 6, the ring 5 being rotatable with the shaft 1 and the ring 6 stationary with the casing 2. The rollers 4 are located between the inner and outer bearing rings 7 and 8, the ring 7 being rotatable with the shaft 1, and the ring 8 stationary with the casing 2. The rollers 3, 4 are suitably mounted in cages 9, 10, respectively, of any suitable construction and held thereby radially relatively to the shaft 1.

The outer ring 5 of the raceway for the rollers 3 thrusts against the collar 11 on the shaft 1, and the outer ring 8 for the rollers 4 thrusts against a bottom shoulder 12 in the casing 2. The thrust load is transferred from the outer or uppermost bearing ring 5, that is, the first bearing ring, with respect to the downward direction of the thrust, through the other bearing rings and the rollers, in two paths, one path through compression member 13 to bearing ring 7, rollers 4 and ring 8; and the other path through the rollers 3, the inner bearing ring 6, a compression thrust member 14 to the lowermost bearing ring 8, which ring 8 thrusts against the bottom shoulder 12. The compression members 13 and 14 are constructed to have the same amount of compression, and as here shown, they have the same amount of metal having the same coefficient of compression, that is, they have the same cubic measurement.

The thrust member 13 by-passes the rollers 3 and the thrust member 14 by-passes the rollers 4. The thrust members 13, 14, in a broad sense, are means between the bearing rings on the shaft, or between bearing rings for rollers of different series, for transferring or by-passing part of the thrust around the series of rollers, the compression member 13 being means by-passing the rollers 3, and the compression member 14, means transferring around the rollers 4.

The bearing rings 5, 6, 7 and 8 are also of metal having the same characteristics and are of such shape as to warp substantially uniformly under the thrust load, the bearing ring 5 fulcruming on collar 11, which surrounds the shaft 1, and the bearing member 7 fulcruming on the lower end of the thrust member 13, as the load is applied downwardly thereto on the series of rollers 4. The inner bearing member 6 fulcrums at its outer rim on the upper end of the thrust member 14 and the outer bearing member 8 fulcrums at its outer rim at 17 on the shoulder 12. These bearing rings are of the same shape or so shaped as to take a leverage action, when so fulcrumed, and under substantially the same load have an equal leverage action. During the operation, these bearing rings warp or deform, as shown in Figure 2, maintaining their bearing faces in parallelism.

In order to facilitate the warping or lever action of the rings 5, 6, 7 and 8, these rings are formed thinner at their margins remote from the fulcrum points than at their margins at the fulcrum points. As here shown, the rings are formed with parallel faces for coacting with the rollers and their other faces are formed inclined or tapering from their fulcrumed margins toward their other or free margins; or in other words, the rings are right angle triangular shaped in general form in cross section. Specifically, the outer ring 5, which coacts with the series of rollers 3, tapers from its fulcrumed margin 13 towards its outer or free margin, while the co-acting inner bearing ring 6 is thicker at its outer margin than at its inner margin, or tapers from its outer fulcrumed margin towards its inner margin, so that it is free to warp or have a cantilever action. The cantilever action of the bearing rings maintains the faces 19, 20, which coact with the rollers 3 in parallelism.

The leverage of these bearing rings 5, 6, 7, 8 is such that the rings warp substantially uniformly under the thrust load and maintain the bearing faces parallel, although out of planes normal to the axis of the shaft 1.

In Figure 2, two paths in which the load is transferred and distributed are indicated by the arrows A and B, subdivisions of the path A being indicated by the arrows C, and of the path B by arrows D. The fulcrums of the bearing ring 5 is at 21; of the ring 6, at 22; the ring 7, at 23; and of the ring 8, at 24.

What I claim is:

1. The combination with a shaft and a casing, one being rotatable relative to the other; of a thrust bearing for the shaft including a plurality of axially-spaced, radial, antifriction members, outer and inner bearing rings for each series providing a raceway therefor, the bearing rings for each series including a ring fixed on the shaft and a ring fixed with the casing, and means between the bearing rings on the shaft for by-passing part of the thrust around the first series of antifriction members to the next series of antifriction members with respect to the direction of the thrust, and means for by-passing a portion of the load from one of the rings fixed with the casing around the second series of antifriction members to the bearing ring of the next series fixed with the casing, in the same direction that a portion of the load is by-passed around the first series of antifriction members, the last of the rings to receive the thrust, thrusting directly against the casing.

2. The combination with a shaft and a casing, one being rotatable relative to the other; of a thrust bearing for the shaft including a plurality of axially-spaced, radial, antifriction members, outer and inner bearing rings for each series providing a raceway therefor, the bearing rings for each series including a ring fixed on the shaft and a ring fixed on the casing, a compression member between the bearing rings of different series on the shaft, a second compression member between the bearing rings of different series stationary with the casing, the last of the bearing rings with respect to the direction of the thrust, thrusting against the casing, whereby a portion of the load is by-passed from the first bearing ring of the first series with respect to the direction of the thrust, through one compression member to the corresponding bearing ring of the next series and from the other bearing ring of the first series through the second compression member to the other bearing ring of the second series, in the same direction that a portion of the load is by-passed around the first series of antifriction members.

3. The combination with a shaft and a casing, one being rotatable relative to the other; of a thrust bearing for the shaft including a plurality of axially-spaced, radial, antifriction members, outer and inner bearing rings for each series providing a raceway therefor, the bearing rings for each series including a ring fixed on the shaft and a ring fixed on the casing, a compression member between the bearing rings for different series on the shaft, a second compression member between the bearing rings for different series fixed on the casing, the last of the bearing rings with respect to the direction of the thrust, thrusting against the casing, whereby a portion of the load is by-passed from the first bearing ring of the first series with respect to the direction of the thrust, through one compression member to the corresponding bearing ring of the next series and from the other bearing ring of the first series through the second compression member to the other bearing ring of the second series, the compression members being the same cubic measurement and of metals having approximately the same degree of compression under the thrust load.

4. The combination with a shaft and a casing, one being rotatable relative to the other; of a thrust bearing for the shaft including a plurality of axially-spaced, radial, antifriction members, outer and inner bearing rings for each series providing a raceway therefor, the bearing rings for each series including a ring fixed on the shaft and a ring fixed on the casing, a compression member between the bearing rings for different series on the shaft, a second compression member between the bearing rings for different series fixed on the casing, the last of the bearing rings with respect to the direction of the thrust, thrusting against the casing, whereby a portion of the load is by-passed from the first bearing ring of the first series with respect to the direction of the thrust, through one compression member to the corresponding bearing ring of the next series and from the other bearing ring of the first series through the second compression member to the other bearing ring of the second series, the thrust members being of substantially the same material and having the same cubic capacity, whereby they compress approximately to the same extent.

HUBERT E. KAYE.